US009933293B2

(12) United States Patent
Earl

(10) Patent No.: US 9,933,293 B2
(45) Date of Patent: Apr. 3, 2018

(54) SPEED-OF-SOUND INDEPENDENT FLUID LEVEL MEASUREMENT APPARATUS AND METHOD OF USE

(71) Applicant: Reservoir Management Services, LLC, Bakersfield, CA (US)

(72) Inventor: Dennis Duncan Earl, Carlsbad, CA (US)

(73) Assignee: RESERVOIR MANAGEMENT SERVICES, LLC, Bakersfield, CA (US)

( * ) Notice: Subject to any disclaimer, the term of this patent is extended or adjusted under 35 U.S.C. 154(b) by 206 days.

(21) Appl. No.: 14/838,588

(22) Filed: Aug. 28, 2015

(65) Prior Publication Data

US 2017/0059388 A1    Mar. 2, 2017

(51) Int. Cl.
*G01F 23/296* (2006.01)
*E21B 47/04* (2012.01)

(52) U.S. Cl.
CPC .......... *G01F 23/296* (2013.01); *E21B 47/042* (2013.01); *G01F 23/2965* (2013.01); *G01F 23/2968* (2013.01)

(58) Field of Classification Search
CPC ... G01F 23/296; G01F 23/2965; E21B 47/042
See application file for complete search history.

(56) References Cited

U.S. PATENT DOCUMENTS

| 4,934,186 A * | 6/1990 | McCoy | E21B 47/042 367/81 |
| 2015/0346017 A1* | 12/2015 | LePort | G01N 33/2823 250/577 |

* cited by examiner

*Primary Examiner* — Paul West
(74) *Attorney, Agent, or Firm* — James M. Duncan, Esq.; Klein DeNatale Goldner

(57) ABSTRACT

A system and method for determining the depth to the top surface of a fluid contained in a hydrocarbon well generates a pressure pulse which travels down the casing to the fluid and receives a returning pressure pulse. The system and method may measure the decay rate or pulse width of the returning pressure pulse and not necessarily require the measurement of the time between the emission of the pressure pulse and the detection of the return pulse to ascertain the depth to the fluid.

17 Claims, 4 Drawing Sheets

SPEED-OF-SOUND INDEPENDENT FLUID LEVEL MEASUREMENT APPARATUS AND METHOD OF USE

BACKGROUND OF THE INVENTION

Embodiments of the present invention relate to the surface determination of the fluid level in the tubing-casing annulus of an oil well, gas well, or water well in a manner that does not require the speed of sound in the annulus to be known. The present invention provides for the accurate surface determination of the fluid level in the tubing-casing annulus through the imposition of a pressure wave of a known pulse width and shape.

Existing techniques that utilize pressure waves or acoustic waves to measure fluid level require the speed of sound in the casing gas to be known to make the fluid level determination. Under the generally utilized devices and methods, the round-trip time for the pressure pulse to return to the surface is measured and, assuming a value for the speed of sound in the casing gas, the distance to the fluid is calculated. In contrast, the present invention can determine the fluid depth without requiring any knowledge of the speed of sound in the casing gas.

SUMMARY OF THE INVENTION

Embodiments of the present invention comprise a system that can be located at the ground surface. The system generates a pressure pulse that travels down the casing at the speed of sound, reflects from the surface of the downhole fluid, and returns back to the surface where it is measured by the system. Because the pressure pulse consists of many different acoustic frequencies, and because different acoustic frequencies experience different speeds of sound in a gas, a process call dispersion, the shape of the pressure pulse will widen the farther the pulse travels. By accurately measuring the decay rate or pulse width of the returning pressure pulse, the distance that the pulse traveled can be directly calculated. In contrast to the generally utilized devices and methods, the present invention does not explicitly require the measurement of the time between the release of the pulse and the detection of the pulse but, instead, measures the decay rate or pulse width of the returning pressure pulse.

DETAILED DESCRIPTION OF THE EMBODIMENTS

Figure 1:
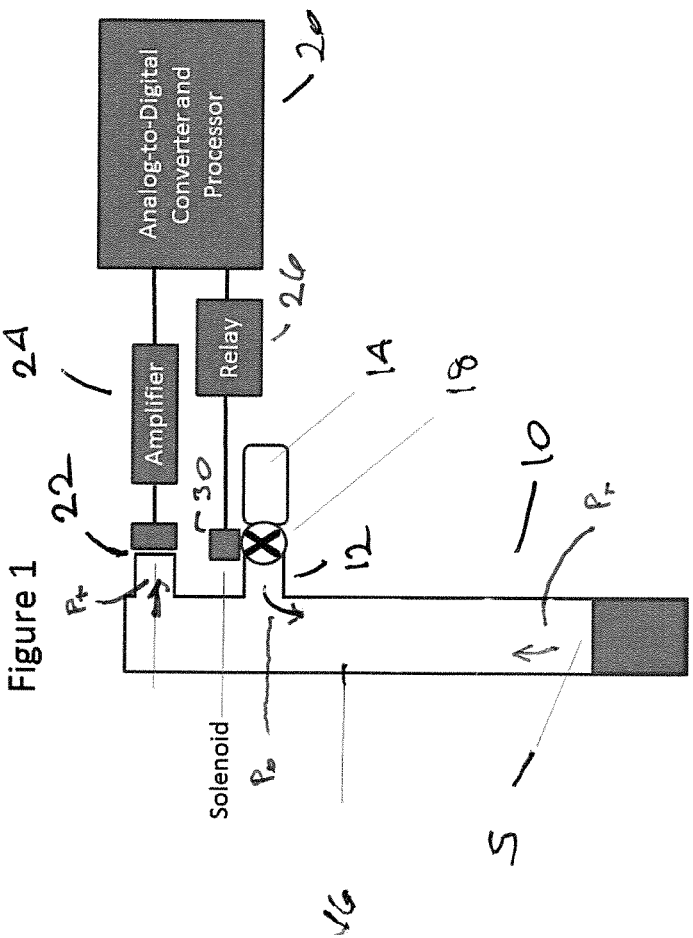
FIG. 1 schematically shows an embodiment of the disclosed system as utilized with a hydrocarbon well.

Referring now to the figures, the present invention comprises a system that can produce a very short and intense pressure pulse which can be utilized to achieve a highly accurate depth to a fluid level S in a hydrocarbon well 10 without the need to measure the trip time for the pulse to make depth determination. An embodiment of the system is schematically depicted in FIG. 1. As shown in FIG. 1, the system generally comprises a hydrocarbon well 10, an access port 12 through which a rapid change in pressure or pressure pulse is dispersed from a pressure pulse source, such as compressed gas cylinder 14. The pressure wave may be generated through other means, such as an exploding chemical reaction.

The pressure pulse may be provided through a fast acting valve 18 which may be opened via actuation of a relay by analog-to-digital converter and processor 20. For example, an electrically operated solenoid valve may be utilized for the fast acting valve 18. As the pressure pulse is introduced into the interior of a string of pipe comprising well casing 16, a traveling pressure wave $P_0$ is created (i.e., pressure pulse at time zero). A traveling pressure wave reflects off of the top surface S of a fluid at a depth within the hydrocarbon well 10 to produce a reflected pressure wave $P_r$.

The system further comprises a pressure wave detection device, such as pressure sensor 22 which may include a signal receiving transducer, such as microphone 22 or accelerometer. Pressure sensor 22 receives the decaying pulse signal $P_t$ of the reflected pressure wave $P_r$ and produces an output signal. Amplifier 24 may be utilized to amplify the output signal. The output signal is received through the analog-to-digital converter and processor 20. The digital converter and processor ("processor") 20 comprises digital circuits which measure the shape of the reflected pressure wave and utilize those measurements to determine the depth to the top surface S of the fluid contained in the casing 16 of hydrocarbon well 10. It is to be appreciated that the processor 20 comprises computational software which, upon receipt of the required input, is capable of determining the depth to the top surface S of the fluid without measuring the time between the introduction of the pressure pulse $P_0$ and the receipt of the decaying pulse signal Pt.

An embodiment of the system may comprise a compressed gas cylinder 14, i.e., a pressure vessel, with a physical volume between 2 and 20 cubic inches that contains compressed gas at a pressure 50 to 1500 PSI above the pressure in casing 16. The gas in the pressure vessel 14 can be any number of gases, including compressed gas from the hydrocarbon well 10 or compressed inert gas, for example Nitrogen, from an external gas cylinder.

Fast acting valve 18 may be coupled to pressure vessel 14 and can be actuated to release the pressure in the pressure vessel. An embodiment of the fast acting valve 18 may have a high flow coefficient between 1 and 10 that allows the valve to release more than 50% of the gas in the pressure vessel 16 in less than 30 to 60 milliseconds. Although a variety of valves could be used to achieve this goal, a pilot driven valve with a solenoid actuator 30 has been found to be acceptable. The solenoid actuation allows the fast acting valve 18 to be opened electrically by a digital processor 20 and a relay 26 at some precise time. The relay 26 should be driven by a zero-crossing relay to reduce any timing errors related to delays associated with application or removal of electricity to the solenoid 30 and physical opening or closing of the valve 18. After 30 to 100 milliseconds, the digital processor 20 and relay 26 de-energize the solenoid actuator 30 and close the valve 18.

An alternative to the pressure vessel 16 with compressed gas higher than the casing gas pressure is a pressure vessel with gas at a pressure lower than the casing gas pressure. A pressure 50-500 PSI lower than the casing gas pressure will produce a similar result as the compressed gas and a pressure higher than the casing gas.

The pressure pulse $P_0$ released during the opening of the solenoid valve is introduced into the casing 16 through an access port 12. The access port 12 may be 0.5" to 4" in diameter and located above ground. The access port 12 may be connected to the pressure vessel 16 through a flexible hose or a rigid pipe.

The pressure pulse $P_y$ travels down the casing and reflects from the top surface S of a fluid located near the bottom of the casing 16 of the hydrocarbon well 10. The distance from the top of the casing 16 to the fluid top surface can be between 100 feet and 15,000 feet.

The reflected pressure wave $P_r$ returns to the top of the casing 16 and is detected by pressure sensor 22. Pressure sensor 22 can be located within the casing 16 or can detect the returning pressure pulse $P_r$ through a port in the casing 16. In one embodiment, the pressure sensor 22 may be connected to a 0.5" to 4" port in the casing 16. The output of the pressure sensor 22 is routed to a signal amplifier 24 that typically results in pressure detection sensitivities between 100 mV/PSI and 5000 mV/PSI. The pressure sensor 22 may be equipped with internal accelerometers that allow the sensor to be vibration compensated, which eliminates any unwanted signals due to non-longitudinal accelerations. The pressure sensor 22 and amplifier 24 may be contained together within a compact, electrically-isolated housing.

The output signal of the pressure sensor 22 is sent to processor 20 that is capable of converting the sensor's analog signal into a digital signal and of digitally processing, for example filtering, the signal. The use of analog filters and signal modifiers prior to any digital conversion and digital processing is also possible.

The digital signal is filtered to reduce electrical noise due to power sources, high-frequency noise above 1000 Hz, DC biases, and low-frequency oscillations less than 10 Hz. A record of the pressure sensor 22 output versus the time since the pressure pulse was released may be accumulated and stored by the processor 20 for a period of 0.1 to 40 seconds following the release of the pressure pulse.

After the pressure signal has been acquired, the signal may be interrogated to determine the amount of dispersion present in the return pressure pulse. The amount of dispersion can be quantified by measuring the returning pressure pulse width. Several methods for characterizing pulse width are possible but, in one embodiment, the Pulse-Width-at-Half-Max (PWHM) definition would be used. In addition, the single exponential decay rate of the pulse's trailing end may be determined to measure dispersion. In some instances, a double exponential formula would be fitted to the trailing pulse edge to better characterize its decay. Alternatively, or in addition, a single or double exponential formula can be fitted to the leading edge growth rate of the pulse.

The leading edge growth rate, trailing edge decay rate, or pulse width of the returning pulse may be compared against experimentally determined or theoretically calculated values to determine the distance that the reflected pulse traveled. This distance can be divided by two to determine the distance from the apparatus to the top surface of the fluid.

When initially produced, the pressure pulse $P_0$ gains strength very quickly and then loses strength, or decays, very quickly. The entire pressure pulse might only last 30 milliseconds. The generated fast signal is made up of many frequencies. When initially produced, the pressure pulse $P_0$ will have a very narrow pulse width, meaning it will grow in intensity very quickly which will be followed by a very fast decay in intensity. As such, the pulse would be said to have a fast decay rate. However, as the pressure pulse propagates through the gas in the casing 16, the different frequencies in the original impulse pulse will travel at different speeds through the gas. Some frequencies will be faster than others and some will be slower. The result is that the width of the pressure pulse will start to grow, a phenomena known as pulse dispersion which is illustrated in FIG. 1. How much the pulse width grows will depend on how far it travels through the gas in the casing 16. The further the pulse travels, the greater the pulse width will spread and the lower the decay rate for the pulse will become.

Because the spreading of the pulse width is caused by the difference in velocity between the different frequencies of the original pulse $P_0$, this differential effect is independent of the actual speed of sound of the casing gas. Instead, the resulting amount of pulse dispersion only depends on the distance the pulse travels through the gas.

Figure 2:
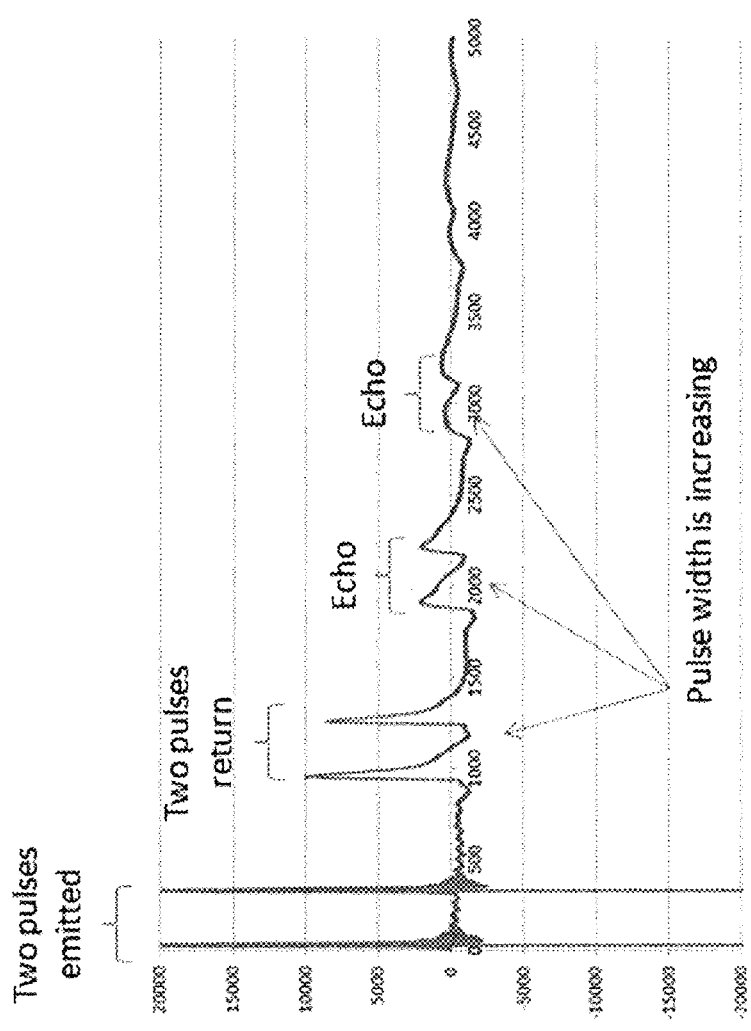
FIG. 2 shows an example of the pulse dispersion effect.

An example of the pulse dispersion effect is shown in FIG. 2. In this figure, a pressure pulse is being emitted and reflected by a fluid surface. However, the initial reflection is also reflected upon measurement, creating multiple echoes of the original signal. With each echo, the initial pulse is traveling a greater distance (i.e. twice the fluid level, three times the fluid level, etc.). As can be clearly seen in FIG. 2, the width of the pulse grows larger with each echo.

Although the width of the pulse can be measured to quantify the amount of pulse dispersion experienced, a better measurement is the decay rate for the returning pulse. As the pulse travels through the casing gas inside the casing 16, the spread in the pulse causes the trailing edge of the pulse to have a growing exponential decay—which can be represented by the general formula shown in Equation 1:

$$\text{Intensity} = Ae^{-Bt} \quad \text{(Equation 1)}$$

Figure 3:
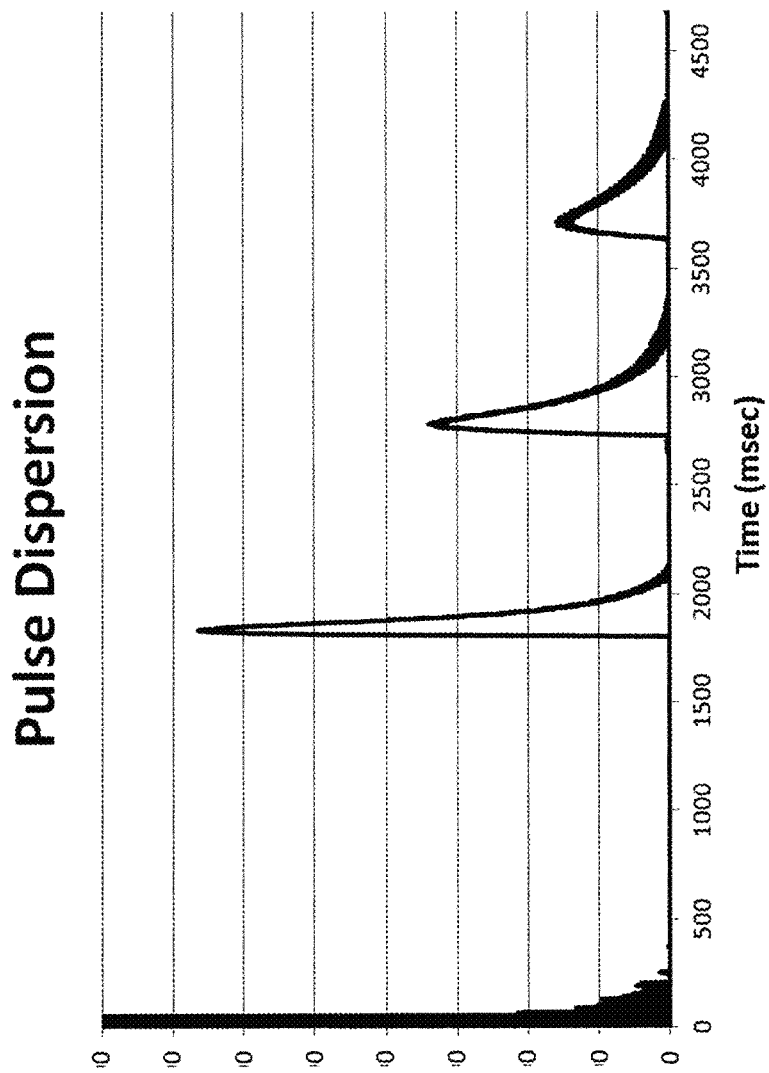
FIG. 3 shows an example of the decay rate of a pulse over time.
Figure 4:
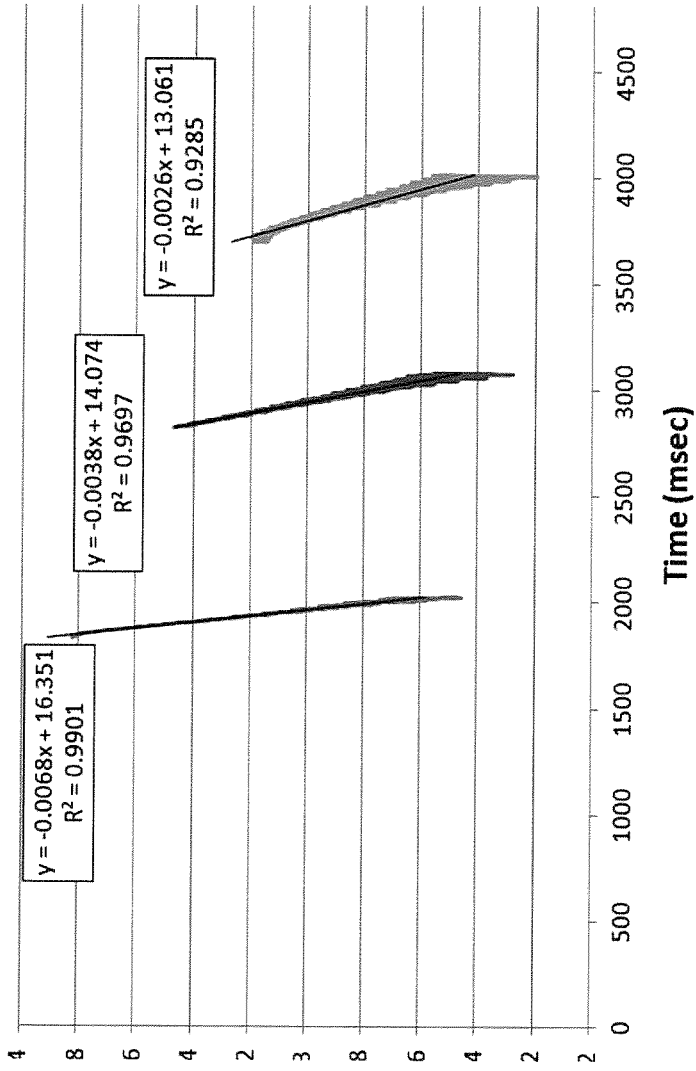
FIG. 4 shows a plot of the natural logarithms of the intensities of FIG. 3.

The decay rate (B) is the rate at which the intensity decreases. By taking the logarithm of the intensity, the exponential decay region in the pulse becomes a linear region, as shown in FIGS. 3-4.

The slope of this linear region is a measure of the decay rate. This decay rate is independent of the signal magnitude. Hence, a pulse that is twice as big in magnitude can still have the same decay rate. The decay rate provides a robust way to accurately measure the amount of pulse dispersion experienced by the pulse. As such, it also represents a robust way to measure, and ultimately calculate, the distance the pulse has traveled.

This pulse dispersion technique can be used for measuring fluid distance independent of the speed of sound. Alternatively, the technique can be combined with the roundtrip time for the pulse to determine the speed of sound in the casing gas. The speed of sound in the casing gas is simply the distance the pulse traveled divided by the roundtrip time. Measuring the speed of sound can be useful for estimating the chemical composition, density, and temperature of the gas.

Furthermore, this method can measure the "average" speed of sound in the casing. Because a pressure pulse traveling down a casing pipe will encounter gases of different composition, temperature, pressure, and density, the speed of sound through different regions of the casing will vary. In some section the speed of sound will be high and the pressure pulse will travel through this section faster. For other sections, the speed of sound will be low and the pulse will travel through this section slower. The total round trip time for the pulse, however, will reflect the average speed of sound in the casing.

To convert a measured decay rate into a fluid distance, empirical measurements of the decay rate for various distances was measured. The conversion from decay rate to fluid distance is relatively simple and follows an exponential trend that can be represented in generalized form as:

$$\text{Distance} = \left(\frac{8.270 \times 10^{13}}{\beta}\right)^{\frac{1}{3.649}}$$

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of one or more of the terms "about," "approximately," "substantially," and "generally." For each such reference, it is to be understood that, in some embodiments, the value, feature, or characteristic may be specified without approximation. For example, where such a qualifier is used, the term includes within its scope the qualified word in the absence of the qualifier.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment. Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any embodiment require every feature shown in a particular drawing.

Unless otherwise noted, the terms "a" or "an" are to be construed as meaning "at least one of." In addition, for ease of use, the words "including" and "having" are interchangeable with and have the same meaning as the word "comprising." Recitation of the term "first" with respect to a feature or element does not necessarily imply the existence of a second or additional such feature or element

Having thus described the preferred embodiment of the invention, what is claimed as new and desired to be protected by Letters Patent includes the following:

What is claimed is:

1. A system for determining depth to a top surface of a fluid, the fluid contained within a string of pipe, the system comprising:
    an access port into the string of pipe through which access port a rapid change in pressure is introduced by a pressure pulse source creating a traveling pressure wave, said pressure wave reflecting from the top surface of the fluid to produce a reflected pressure wave;
    a pressure wave detection device comprising an accelerometer attached to the string of pipe, said pressure wave detection device upon detection of the reflected pressure wave produces an output signal;
    a digital processor which, upon receipt of the output signal from the detection device, measures the shape of the reflected pressure wave and uses that measurement to determine the depth to the top surface of the fluid contained within the string of pipe.

2. The system of claim 1 wherein the reflected pressure wave has a trailing end having a decay rate wherein the decay rate is measured and used by the digital processor to calculate fluid depth.

3. The system of claim 1 wherein the reflected pressure wave has a pulse width and the pulse width and used by the digital processor to calculate the depth to the top surface the fluid.

4. The system of claim 1 wherein the pressure pulse source comprises a compressed gas cylinder and fast acting valve.

5. The system of claim 4 wherein the fast acting valve is an electrically operated solenoid valve.

6. The system of claim 1 wherein the pressure pulse source comprises an exploding chemical reaction.

7. The system of claim 1 wherein the pressure wave is communicated to the pressure detection device through a separate outlet attached to the string of pipe.

8. A system for determining depth to a top surface of a fluid, the fluid contained within a string of pipe, the system comprising:
    an access port into the string of pipe through which access port a rapid change in pressure is introduced creating a traveling pressure wave, said pressure wave reflecting from the top surface of the fluid to produce a reflected pressure wave;
    an outlet disposed in the pipe through which the reflected pressure wave can be extracted;
    a cylinder storing compressed gas attached to a fast acting valve, the valve being attached to the access port;
    a pressure wave detection device comprising an accelerometer attached to the pipe through the outlet, said pressure wave detection device producing an output signal upon detection of the reflected pressure wave;
    a digital processor which, upon receipt of the output signal from the pressure wave detection device, measures the shape of the reflected pressure wave and uses that measurement to determine the depth to the top surface of the fluid contained within the string of pipe.

9. The system of claim 8 wherein the reflected pressure wave has a trailing end having a decay rate wherein the decay rate is measured and used by the digital processor to calculate fluid depth.

10. The system of claim 8 wherein the reflected pressure wave has a pulse width and the pulse width is measured and used by the digital processor to calculate the depth to the top surface of the fluid.

11. The system of claim 8 wherein the fast acting valve is an electrically operated solenoid valve.

12. A method of ascertaining a depth to a top surface of a fluid within a string of pipe, the method comprising the steps of:
    releasing an initial pressure pulse into the string of pipe;
    receiving a return pressure pulse which is reflected from the top surface of the fluid, the return pressure pulse having a pulse width;
    measuring the pulse width of the return pressure pulse with an accelerometer to ascertain a measured pulse width; and
    calculating the depth to the top surface of the fluid utilizing the pulse width of the return pressure pulse.

13. The method of claim 12 wherein the calculation of the depth to the top surface of the fluid does not require any time measurement from the release of the initial pressure pulse to the receipt of the return pressure pulse.

14. A method of ascertaining a depth to a top surface of a fluid within a string of pipe, the method comprising the steps of:
   releasing an initial pressure pulse into the string of pipe;
   receiving a return pressure pulse which is reflected from the top surface of the fluid, the return pressure pulse having a decay rate;
   measuring the decay rate to ascertain a measured decay rate; and
   calculating the depth to the top surface of the fluid utilizing the measured decay rate of the return pressure pulse.

15. The method of claim 14 wherein the calculation of the depth to the top surface of the fluid does not require any time measurement from the release of the initial pressure pulse to the receipt of the return pressure pulse.

16. The method of claim 14 wherein the measured decay rate is converted to the depth to the top surface of the fluid utilizing an equation in the form of $$\text{Distance} = \left(\frac{8.270 \times 10^{13}}{\beta}\right)^{\frac{1}{3.649}}.$$

17. The method of claim 14 wherein a time is measured from the releasing of the initial pressure pulse until the receiving of the return pressure pulse resulting in a time measurement, wherein the time measurement and the depth calculated from claim 14 are used to determine an average speed of sound of the gas in the string of pipe.

* * * * *